Feb. 26, 1963 R. L. TOMAYER 3,079,089
ELECTRONIC MOISTURE SENSING CONTROL SYSTEM
Filed June 2, 1961 2 Sheets-Sheet 1
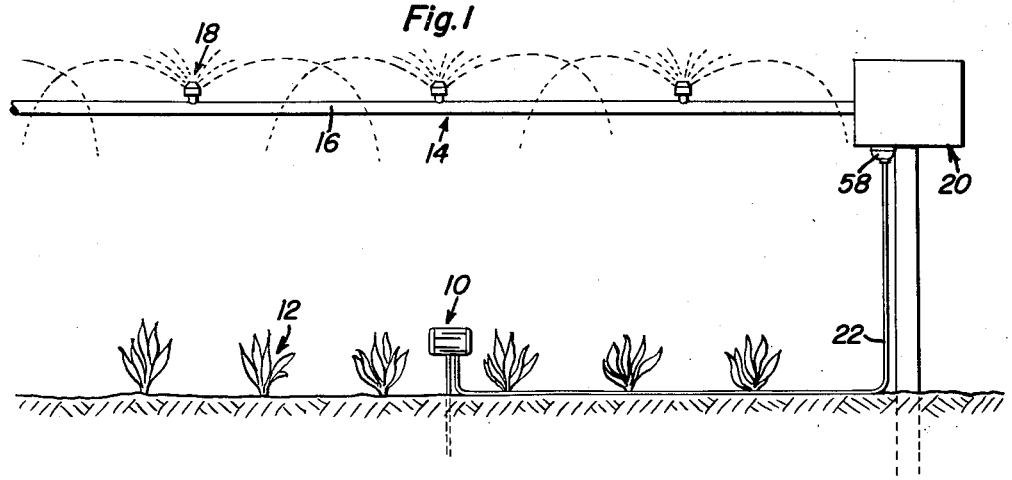
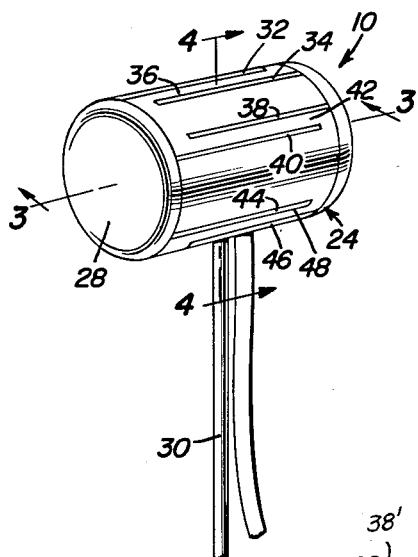
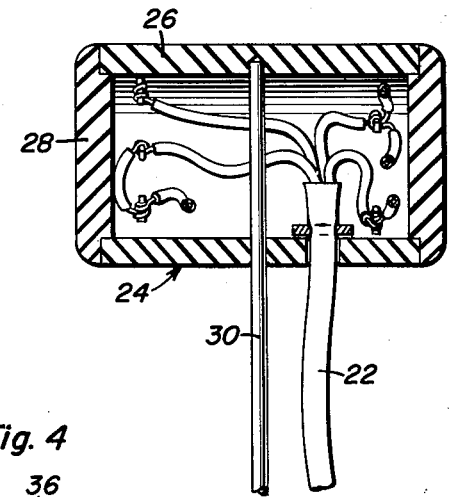
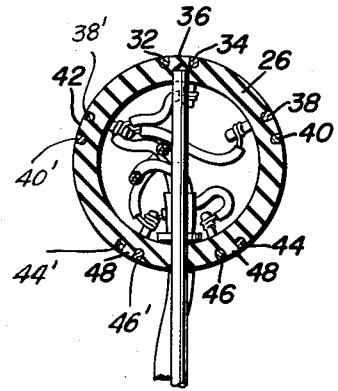
Robert L. Tomayer
INVENTOR.

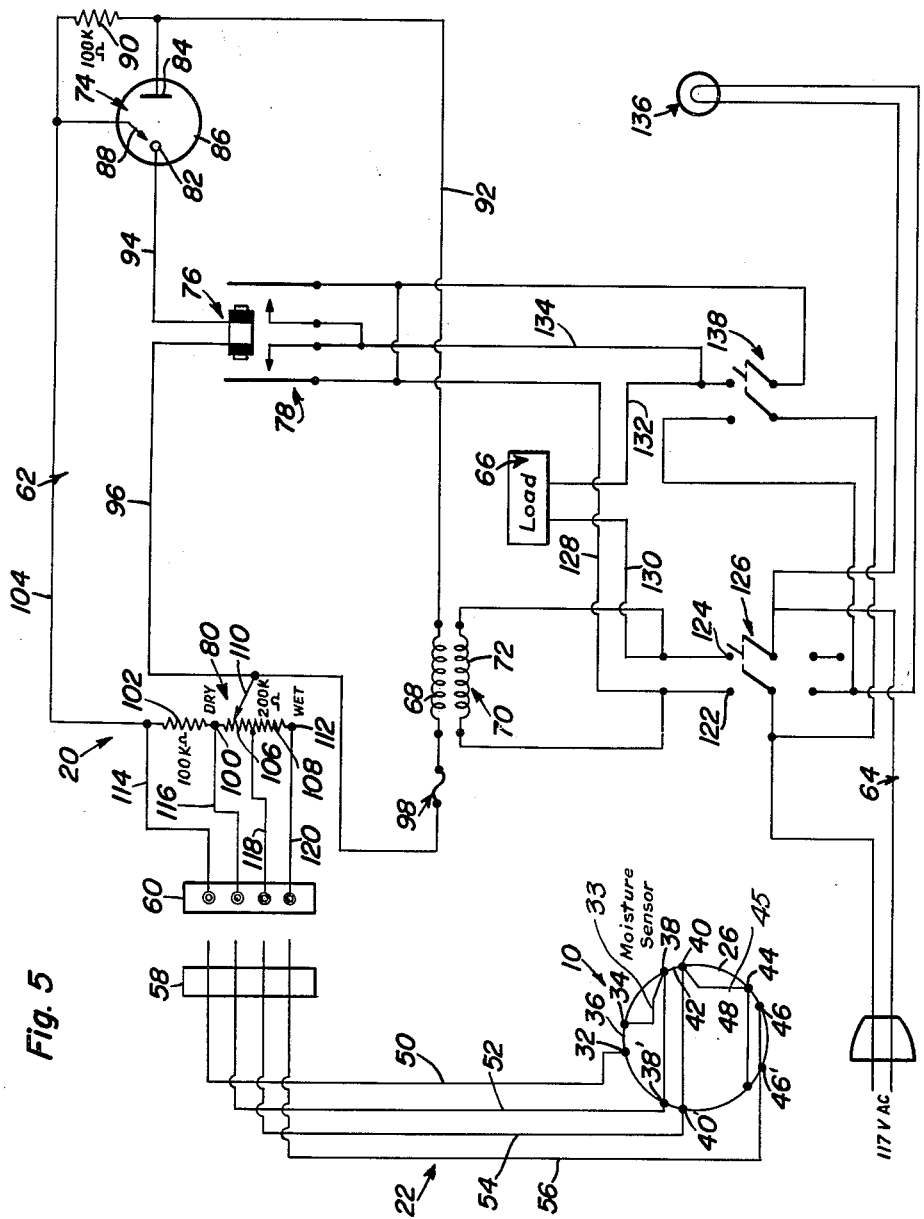

United States Patent Office 3,079,089
Patented Feb. 26, 1963

3,079,089
ELECTRONIC MOISTURE SENSING
CONTROL SYSTEM
Robert L. Tomayer, Joliet, Ill.
(R.F.D. 2, Fennville, Mich.)
Filed June 2, 1961, Ser. No. 114,547
10 Claims. (Cl. 239—63)

This invention relates to a system for regulating the application of a liquid spray mist to exposed leaves of uprooted plant materials and is accordingly particularly useful to horticulturalists in exercising an exacting control over the moisture coating plant material necessary to maintain turgidity thereof during rooting.

It is therefore a primary object of the present invention to provide a moisture control system that may be associated with any suitable type of liquid spray misting mechanism in order to regulate both the density of moisture coating the plant material and the extent to which the moisture coats the plant surfaces by selectively turning on and shutting off the mist spraying mechanism.

Another object of the present invention is to provide a control system for regulating the moisture on exposed leaves of uprooted plant materials during rooting thereof, by providing a constant or instantaneous control over a mist spraying device whereby both the liquid density and the extent to which the plant leaves are coated by the liquid or the moisture distribution may be precisely controlled to any desired amount.

Moisture responsive control devices heretofore available have been unsatisfactory for the exacting moisture control necessary and desirable for horticultural purposes inasmuch as such control systems responded merely to a change in gap resistance effected by changes in the moisture content and/or water vapor in the atmosphere surrounding the plant material in order to control the application of the liquid thereto in mist form. The system of the present invention however achieves its more reliable and precise control by not only responding to changes in the density of the liquid in the atmosphere which affects the evaporation rate of liquid from the sensing unit surfaces but also to the extent to which the liquid droplets are able to coat the exposed surfaces of the leaves or changes in the location of the gap changing resistance.

A still further object of the present invention is to provide a moisture sensing control system providing for infinite variation in the regulation of the moisture as well as to change the range of moisture control.

A further object of the present invention is to provide a novel sensing unit by virtue of which the control system is capable of exercising the precise instantaneous and predictable control over the mist spraying system in accordance with existing moisture coating conditions of the plant surfaces without any error producing delay inherent in sensing units which rely only on the rate of evaporation to sense the moisture condition of the misted atmosphere to the exclusion of instantaneous moisture distribution materials.

In accordance with the foregoing objects, the control system of the present invention including the aforementioned sensing unit is rendered useful for its purpose in that the sensing unit may be safely and readily positioned between the plant materials and connected by a cable to a remotely located control device connected to a source of electrical power. The control device is extremely simple and yet effective for the intended purpose in that a single gas-filled, cold cathode tube is utilized, together with a switch relay device and variable potentiometer providing a regulatable control for turning on and off a valve mechanism admitting water to the spray misting nozzles. The control circuit of the control device is therefore energized from a source of power connected to the control circuit by an isolation transformer, the control circuit being operative when the cold cathode tube is triggered to close the relay switch device whereby the valve mechanism for the mist spraying nozzle is opened to apply the water mist to the atmosphere surrounding the plant material. When the sensing unit senses the presence of the proper amount of water in liquid form, it is operative through the control circuit to shunt the cold cathode tube whereupon the relay switch device will open to deenergize the control valve mechanism for shutting off the misting spray. The response to the sensing unit is controlled and infinitely varied by means of the potentiometer.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 illustrates the installation of the moisture control system of the present invention for control of a typical misting spray device for plant material during rooting.

FIGURE 2 is a perspective view of the sensing unit of the present invention.

FIGURE 3 is a sectional view taken substantially through a vertical plane indicated by section line 3—3 in FIGURE 2.

FIGURE 4 is a sectional view taken substantially through a plane indicated by section line 4—4 in FIGURE 2.

FIGURE 5 is a circuit diagram of the moisture control system of the present invention.

Referring now to the drawings in detail, it will be observed in FIGURE 1, that the moisture control system includes a sensing unit generally referred to by reference numeral 10 which is fixedly mounted in the earth, amongst a plurality of uprooted cuttings 12 or other such plant materials set into the earth for rooting purposes in order to sense moisture density and distribution thereon. Misting apparatus generally referred to by reference numeral 14 is therefore provided including a water supply conduit 16 to which a plurality of upwardly projecting spray nozzles 18 are connected so that when water is supplied to the conduit 16 under pressure, the nozzles 18 will issue therefrom a spray forming a water mist in the atmosphere surrounding the plant materials 12. Any suitable control valve mechanism is therefore associated with the water supply conduit 16 which control valve mechanism is selectively opened and closed by a control device generally referred to by reference numeral 20 connected to the control valve mechanism. The control device 20 may therefore be remotely located with respect to the sensing unit 10 which is connected thereto by an electric cable 22. Accordingly, water from any suitable source may be selectively admitted into the supply conduit 16 by the control device 20 in response to signals from the moisture sensing unit 10.

The moisture density and distribution sensing unit 10 as more clearly seen in FIGURES 2, 3 and 4 consists of a carrier member generally referred to by reference numeral 24 which includes a cylindrical portion 26 closed at the opposite axial ends thereof by members 28. The cylindrical member 26 and end closure members 28 are made of non-conductive material forming a protective enclosure into which the cable 22 extends. It will therefor be apparent that the non-conductive material of which the protective enclosure is formed, will prevent deposit of current shorting moisture on the exposed conductor ends that extend from the cable 22 within the protective enclosure of carrier member 24. The carrier 24 is mounted in the earth in fixed position by means of a rod 30 which is connected to the cylindrical member. Mounted on the external surface of the cylindrical member 66 from which moisture would readily evaporate are a plurality of closely spaced pairs of circumferentially spaced conductors which extend in an axial direction. In the example illustrated, a pair of uppermost conductors 32 and 34 are spaced apart by ⅛ inch forming therebetween what is referred to as a dry gap. The dry gap referred to by reference numeral 36 is ordinarily non-conductive in view of the non-conductive material of which the cylindrical member 26 is constructed and a relatively dry surrounding atmosphere to which the conductors are exposed. However, when liquid from the mist spraying nozzles 18 is deposited on the dry gap 36, eventually the surface between the conductors 32 and 34 will become conductive by the deposit of liquid droplets on the external evaporating surface of the cylindrical member 26. Two pair of conductors 38 and 40 and 38' and 40' spaced 3/16 of an inch apart are placed approximately 65 degrees on either side of the uppermost conductors 32 and 34 so as to form therebetween what are referred to as medium gaps 42 which when coated sufficiently with liquid will provide a conductive path between the conductors 38 and 40 and the conductors 38' and 40'. It will of course become apparent that the medium gap 42 will become conductive following saturation of the gap 36 with liquid. Finally, two pairs of conductors 44 and 46 and 44' and 46' defining therebetween a wet gap 48 are displaced approximately 150° on either side of the uppermost conductors 32 and 34, the conductors 44 and 46 and 44' and 46' being spaced apart 3/16 of an inch. Considerable saturation of the dry gap 36 and medium gap 42 must therefore occur before the gap 48 becomes conductive. The liquid mist filling the atmosphere surrounding the plant material 12 will therefore be deposited on a cylindrical evaporating surface of the sensing unit 10 to sense both the sustained density of accumulated liquid deposit on the cylindrical surface the reduction of which is delayed in accordance with the evaporation rate and the distribution or extent to which the cylindrical surfaces are coated by the liquid mist accurately reflecting the extent to which the plant material remains coated with liquid. The cable 22 therefore provides an electrical connection between the pairs of gap-defining conductors lining the cylindrical surface of the sensor unit. In the arrangement illustrated, the cable 22 includes four wires by means of which the pairs of conductors circumferentially exposed on the cylindrical surface of the sensing unit are connected to the control device 20.

Referring therefore to FIGURE 5, it will be observed that the moisture sensor or sensing unit 10 is diagrammatically illustrated showing the cable 22 as including four wires 50, 52, 54 and 56 for connecting shunt controlling resistances across the gaps 36, 42 and 48. The wire 50 is shown connected to the conductor 32, while the wire 52 is connected to the conductor 38' on one side (left side as viewed in FIGURE 5). The wire 54 is connected to the conductor 40' while the wire 56 is connected to the lowermost conductor 46'. Internally of the sensing unit 10 within the cylindrical member 26, the conductor 34 is electrically connected by wire 33 to conductor 38. The conductor 40 is also electrically connected by wire 45 to the conductor 44. Thus, the gaps 36, 42 and 48 on each side of the carrier 24 as variable resistors are connected to each other in series because of the connecting wires 33 and 45 as clearly shown in FIGURE 5. Thus, the gaps 36, 42 and 48 as variable resistors are connected to each other in series. The conductors 38', 40', 44' and 46' on the left side are also electrically interconnected in parallel with conductors 38, 40 and 44 respectively so as to connect the gaps disposed on opposite sides of the dry gap 36, in parallel with each other. The cable 22 containing the four wires electrically connected to the conductors on the cylindrical surface of the sensing unit, are connected at their ends remote from the sensing unit 10 to a plug 58 by means of which the sensing unit 10 may be operatively connected to the control device 20 through a jack device 60 for receiving the prongs of the plug device 58. As seen in FIGURE 5, the control device 2 includes a control circuit generally referred to by reference numeral 62 which is operatively connected to a power circuit generally referred to by reference numeral 64 whereby the mist control valve mechanism 66 may be selectively opened and closed as will be explained in further detail.

The control circuit 62 includes a source of power which is in the form of the secondary winding 68 of an isolation transformer generally referred to by reference numeral 70 also having a primary winding 72 which is connected in the power circuit 64. The control circuit 62 furthermore includes a control relay mechanism for the control valve mechanism 66 including a gas-filled cold cathode triode tube 74 and a relay solenoid 76 for controlling relay switch device 78. Also connected in the control circuit 62, is a center tapped potentiometer device generally referred to by reference numeral 80 providing a variable comparison resistance in parallel with the infinitely variable gap resistances on the sensing unit 10.

The cold cathode tube 74 includes a cathode 82 and an anode 84 defining therebetween a main gap within the gas filled envelope 86. The cold cathode triode 74 also includes the starter electrode 88 which is electrically connected to the anode 84 through a high resistance resistor 90. The anode 84 is connected by conductor 92 to one terminal of the transformer secondary 68 while the cathode 82 is connected by conductor 94 to the relay solenoid 76 which in turn is connected by the conductor 96 to the other terminal of the transformer secondary 68 through a fuse device 98. When a voltage is induced within the secondary 68 by the primary of the transformer 70, the volt drop across the relay coil 76 in series with the tube 74 will reduce the voltage applied across the main gap between the anode 84 and cathode 82 below breakdown value. However, the current in resistor 102 connected in parallel with solenoid 76 will be sufficient to cause transfer current flow between starter 88 and cathode 82 causing the triode tube 74 to become conductive to thereby energize the relay solenoid 76 and close the relay switch device 78. As a result thereof the control valve mechanism 66 will be energized and the valve opened so as to cause misting spray to be applied to the plant material. By operation of the sensing unit 10 through the potentiometer device 80, lower resistance shunting of resistor 102 will occur so as to reduce the current in the parallel branch including electrode 88 below transfer value rendering the tube nonconductive whereupon the relay solenoid 76 becomes deenergized causing the relay switch device 78 to open and the control valve to close. Thereafter, current control of the sensing unit 10 as regulated by selecting an effecting portion of the resistance provided by the potentiometer device 80 will vary the current in the starter element 88 to control opening and closing of the valve mechanism 66.

The regulation provided by the potentiometer device 80 will vary the response of the triode 74 to changes sensed by the sensing unit 10. The potentiometer 80 therefore includes a dry terminal element 100 which is connected by the high resistor 102 and conductor 104 to the starter element 88 of the triode 74. A center tapped variable resistor including portions 106 and portion 108 is operatively connected to the conductor 96 by the potentiometer arm 110. The variable resistor is also connected to the dry terminal 100 and to the lower wet terminal 112. The fixed resistor 102 is therefore connected across the upper conductor 32 and medium conductor 38 of the sensor 10 through the wires 50 and 52 connected by the plug 58 and jack 60 to the wires 114 and 116. The portion 106 of the variable resistor is connected by the center tap wire 118 and wire 116 across the medium conductors 38 and 40 by the wires 52 and 54. Finally, the portion 108 of the variable resistor is connected by the center tap wire 118 and the wet terminal wire 120 across the medium conductor 40 and wet conductor 46.

From the foregoing description operation of the control circuit in conjunction with the sensing unit 10 will be apparent. Accordingly, when the transformer 70 is energized starting with a potentiometer setting of dry that is, the arm 110 being set at the dry terminal 100, and the dry gap 36 having no moisture thereon, the triode tube 74 will be shunted only by the 100,000 ohm resistor 102 whereupon the tube 74 is triggered by the current forced to flow through the starter electrode 88 causing the relay solenoid 76 to close the switch 78 whereupon misting begins. When the moisture is sufficiently deposited on the dry gap 36, the reduced resistance of the dry gap 36 will shunt the resistor 102 reducing the current in the starter 88 below transfer value rendering the tube 74 non-conductive. As a result thereof, the relay solenoid 76 will be deenergized, the switch device 78 opened and misting stopped. When the dry gap 36 is again sufficiently dry so as to increase the resistance thereacross, the triode 74 again becomes conductive to again begin misting. Thus, in the dry setting of potentiometer 80, instantaneous bidirectional control is provided in response to shunt resistance changes produced by moisture on one fixed gap.

By moving the control arm 110 of the potentiometer 80 from the dry terminal 100 toward the center tap of the variable resistor, the resistance shunt provided by resistor 102 across the triode 74 is increased by infinitely variable amounts by adding a portion of the shunt controlling resistance portion 106 to the fixed resistor 102 requiring a greater degree of conductivity in the dry gap 36 before shunting of the combined resistance occurs to render the triode non-conductive to stop misting. When the control arm 110 of the potentiometer 80 is on the center tap of the variable resistor, the shunt circuit of the triode will include and be connected across both the dry gap 36 and the medium gap 42 since the center tap wire 118 is connected to the medium conductors 40. Accordingly, an increased amount of moisture must be deposited on the cylindrical surface of the sensor unit 10 before the medium gap 42 in addition to the dry gap 36 becomes sufficiently conductive as to sufficiently shunt the current to the triode 74 causing discontinuance of the misting. Furthermore, response of the triode to the moisture content will not only depend on the shunt resistance change in a single fixed gap, the dielectric property of which may be effected by other factors such as electrolytic and evaporative accumulations, but also by a location change in moisture deposition on the evaporation surface of cylinder 26 through the cumulative change in shunting resistance effected by the gap 42. Movement of the potentiometer control arm 110 beyond the center tap across the other shunt resistance portion 108 of the variable resistor will again introduce additional resistance into the resistor shunting circuit for the triode requiring a further increase in the conductivity of the medium gap 42 before shunting of the triode 74 occurs, rendering the triode non-conductive. Finally, when the potentiometer control 110 is on the wet terminal 112, the wet terminal wire 120 will connect the combined resistance of the fixed resistor 102 and both portions 106 and 108 of the variable resistor across the three gaps 36, 42 and 48 requiring the maximum amount of moisture coating of the cylindrical surface before the triode is shunted to render it non-conductive for stopping the misting. It will therefore be appreciated from the foregoing, that an infinite control is provided by the potentiometer 80 which will not only infinitely vary the sensor response to moisture density coating the cylindrical surface for stopping misting but will also vary the control over the mist control valve 66 in accordance with the extent to which the moisture must coat the cylindrical surface of the sensor unit 10. Inasmuch as the pairs of conductors on the cylindrical surface of the sensor unit are arranged in different planes by virtue of their angular displacement from the uppermost conductors 32 and 34, by introducing the different gaps between the conductors, the extent to which the moisture coats the exposed leaf surfaces will be reflected.

As hereinbefore indicated, the control circuit 62 is powered by the transformer 70. The primary 72 of the transformer 70 is therefore connected to the on terminals 122 and 124 of the power circuit 64 which terminals 122 and 124 may be connected by the on-off switch device 126 to a 117-volt A.C. source. Also connected to the on terminals 122 and 124, are a pair of conductors 128 and 130. The conductor 130 is connected to the control mechanism 66 to which conductor 132 is also connected. The conductor 128 is connected to a terminal of the relay switch device 78, the other terminal of which is connected by conductor 134 to the conductor 132. Accordingly, when the on-off switch 126 is closed, and the switch device 78 is closed, the power circuit will be closed including the valve mechanism 66 whereupon misting occurs. When the on-off switch 126 is put in the off position, a circuit will be closed through the pilot light 136 so as to indicate the off position of said switch 126. There is also provided a manual override control switch 138 which when closed, will close a power circuit through the control valve mechanism 66, by-passing the relay switch device 78 in order to provide manual means for maintaining the misting when desired. When the manual override switch 138 is closed the pilot light 136 will also be connected in circuit so as to indicate such condition.

From the foregoing description, operation and utility of the moisture control system of the present invention will be apparent. It will therefore be further appreciated, that the control system of the present invention unlike many other moisture control systems responds to the presence of water in liquid form and the extent to which such liquid coats a surface. Furthermore, the control circuit of the system includes a single sensing unit and control potentiometer for a most sensitive regulation that may eliminate the need for cleaning, and replacement of the sensing unit because of resistance changing accumulations on the surfaces thereof. Finally, the control circuit includes the use of a single cold cathode tube which is particularly useful for the present installation inasmuch as the relay circuit operates relatively infrequently, it being known that cold cathode, gas-filled type tubes are most reliable despite the infrequent operation thereof. Furthermore, by virtue of the isolation transformer constituting the source of power for the control circuit and the high resistance therein, the system is safe to handle. In addition to the above, the simplicity of operation and construction involved further enhances the utility of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A control system for regulating the amount and distribution of liquid mist coating surfaces of plant material comprising, liquid mist applying means, control means operatively connected to the mist applying means for rendering said mist applying means operative and multi-surface sensing means operatively connected to the control means and fixedly mounted adjacent said plant material to instantaneously render the mist applying means inoperative in response to changes in density and distribution of surface deposited moisture, said multi-surface sensing means comprising, a continuous surface carrier mounted between said plant material to stimulate variations in moisture coated conditions thereof, a plurality of gap means mounted in spaced relation on the carrier in different planes so as to effectively establish infinite resistance therebetween when operative for establishing signals through the control means to render the mist applying means operative and inoperative.

2. The combination of claim 1, wherein said control means includes relay means operatively connected to the mist applying means, high resistance control circuit means operatively connected to said relay means for operation thereof to render the mist applying means operative, said circuit means being operatively connected to said sensing means for shunting the relay means to render it inoperative in response to a predetermined deposit of moisture on the sensing means.

3. The combination of claim 2, wherein said relay means includes cold-cathode tube means connected to a source of voltage and relay switch means operatively connected to the cold-cathode tube means and the mist applying means for closing of the switch means when the cold-cathode means is rendered conductive, to operate the mist applying means.

4. The combination of claim 3, wherein said control circuit means includes infinitely controllable shunt regulating means connected in parallel with said relay means operative to selectively vary the response of the relay means to the sensing means and connecting means operatively connecting the sensor means across the regulating means for shunting the relay means.

5. The combination of claim 4, wherein said regulating means includes a fixed resistance connected in series with a tapped potentiometer, said connecting means connecting the sensing means across both the fixed resistance and tapped potentiometer.

6. The combination of claim 1, wherein said carrier is a cylindrical liquid mist depositing surface member made of non-conductive material.

7. The combination of claim 6, wherein each of said gap means comprises a pair of closely spaced conductors mounted on the carrier in circumferentially spaced relation defining moisture evaporation surfaces therebetween.

8. A moisture sensing unit for controlling liquid misting for plant material comprising, non-conductive, continuous surface supporting means fixedly mounted for unrestricted evaporative exposure to a moisture-laden atmosphere, spaced conductor means mounted on said surface means for defining a plurality of resistance varying surface gaps disposed in different planes and effectively spaced to establish infinite resistance therebetween under operating conditions to conduct electrical signals in response to deposit of moisture thereon reflecting moisture density and distribution on surfaces of adjacent plant material, and means operatively connected to said spaced conductor means for rendering said gaps operative to a selectively variable extent to regulate the moisture, density and distribution on the plant material produced by liquid misting.

9. An automatic misting system for cutting beds and the like comprising a sprinkler extending over the bed and having a plurality of misting nozzles operable upon supply of liquid to direct a mist of spray liquid over said bed, a control device to control the supply of spray liquid to the sprinkler, and automatic control means to operate said control device comprising a plurality of spaced apart pairs of conductive elements, a continuous surface supporting carrier effectively mounting said pairs of conductive elements with infinite resistance therebetween when operative in circumferentially spaced relation to each other in an elevated position in the atmosphere between the foliage of the plants in the bed to sense both moisture density and distribution on the plants, and consisting of a cylindrical enclosure embedding said pairs of conductive elements in surface exposed relation to an external non-conductive surface to define surface insulating gaps between the conductive elements of each pair of conductive elements operable to be electrically connected by moisture deposited on said surface defining gaps during supply of spray liquid to said sprinkler and to be electrically disconnected upon evaporation of said deposited moisture, said control means operable upon electrical connection between the conductive elements of selected pairs of conductive elements to interrupt the supply of liquid to the sprinkler whereby said misting nozzles operate automatically to maintain the bed moist in accordance with preselected moisture coated conditions of said foliage of the plants.

10. An electrical control circuit for sensing moisture deposit reflected by electrical gap resistance variable within different ranges in accordance with variable moisture density and changes in distribution of moisture deposit, and operating a control device when the electrical resistance within a predetermined range falls below a predetermined value comprising: means providing a comparison electrical resistance; means connected to said first mentioned means for selecting an effective portion of said comparison resistance that is in parallel with said moisture deposit gap resistance at said predetermined value within said predetermined range, means for providing a source of electrical potential, relay means for connecting said control device to said source of potential when energized by a triggering current, and means operable in response to shunting of said effective portion of the comparison resistance by said moisture deposit gap resistance at said predetermined value within said predetermined range to supply triggering current to said relay means.

References Cited in the file of this patent

UNITED STATES PATENTS

| | | |
|---|---|---|
| 2,737,615 | Roby et al. | Mar. 6, 1956 |
| 2,969,185 | Geiger | Jan. 24, 1961 |